Dec. 2, 1952 J. T. POTTER 2,620,389

THREE-DIMENSIONAL SELECTOR AND MEMORY DEVICE

Filed Sept. 1, 1948 4 Sheets-Sheet 1

INVENTOR.
JOHN T. POTTER

BY Alfred W. Barber
ATTORNEY

THREE-DIMENSIONAL SELECTOR AND MEMORY DEVICE

Filed Sept. 1, 1948 4 Sheets-Sheet 2

INVENTOR.
JOHN T. POTTER
BY Alfred W. Barber
ATTORNEY

Dec. 2, 1952 J. T. POTTER 2,620,389

THREE-DIMENSIONAL SELECTOR AND MEMORY DEVICE

Filed Sept. 1, 1948 4 Sheets-Sheet 3

INVENTOR.
JOHN T. POTTER

BY *Alfred W. Barber*

ATTORNEY

Dec. 2, 1952 J. T. POTTER 2,620,389

THREE-DIMENSIONAL SELECTOR AND MEMORY DEVICE

Filed Sept. 1, 1948 4 Sheets-Sheet 4

INVENTOR.
JOHN T. POTTER
BY Alfred W. Barber
ATTORNEY

Patented Dec. 2, 1952 2,620,389

UNITED STATES PATENT OFFICE 2,620,389

THREE-DIMENSIONAL SELECTOR AND MEMORY DEVICE

John Tuft Potter, Sandspoint, N. Y.

Application September 1, 1948, Serial No. 47,292

7 Claims. (Cl. 177—353)

The present invention concerns cataloging or filing devices and, in particular, what may be designated as a three dimensional electronic memory.

The filing and cataloging of a wide range of information is a complex and growing problem. A simple file consists in the indexing of a relatively small amount of information under a few significant titles. A few dozen subjects may be handled in this way and when any particular information is desired it may be extracted manually. Files set up according to this simple system are cumbersome and space consuming.

Information may be somewhat condensed by the use of card files. Further condensation may be accomplished by photographing information on a small photographic film. These methods save space but the derivation of information from such files is still time consuming.

Punched card systems have been devised which are particularly useful where analysis or sorting of information into various classifications is important.

There is still a large and growing need for a catalog or file system which will hold a large number of facts and especially one which will yield desired facts quickly. The present invention concerns a system and devices for storing a large number of facts any one of which may be practically instantaneously selected and reproduced. The uniqueness and advantages of the present system and devices according to the present invention inherently derives from the fact that it is a three dimensional system as compared with two dimensional systems hitherto available.

In its preferred form the present invention consists in a large number of steel wires carrying information recorded directly or in the form of coded pulses. These wires are disposed in rows and layers in which, for instance, 10,000 wires are contained in 100 layers each layer comprising a row of 100 wires. A two dimensional selecting system permits practically instantaneous selection of any one of the 10,000 wires. Once selected the desired information is derived by a third dimensional motion for reproducing or picking off the information from the wire. The entire process of selecting any wire, reproducing the information and restoring the device to its initial condition may be accomplished in a time of the order of one second.

One object of the present invention is to provide a method of and means for storing and rapidly selecting and reproducing a large amount of information.

Another object is to provide a method of and means for storing a great number of quickly derivable facts in a small space.

Still another object is to provide a method of and means for storing a large number of facts which may be practically instantaneously selected by means of a simple code as by means of two numbers from 1 to 99 and a selecting mechanism as, for instance, a dialing device.

An additional object is to store information in a two dimensional system or device.

A further object is to store a large number of facts in a two dimensional system and to utilize a third dimension to derive or reproduce any of the desired facts.

These and other objects will be apparent from the detailed description of the invention given in connection with the various figures of the drawing.

In the drawing:

Fig. 1 shows a perspective view of the essential components of the preferred form of the present invention.

Fig. 2 a view of a frame carrying the recording wires utilized in the form of the invention shown in Fig. 1.

Figure 1:
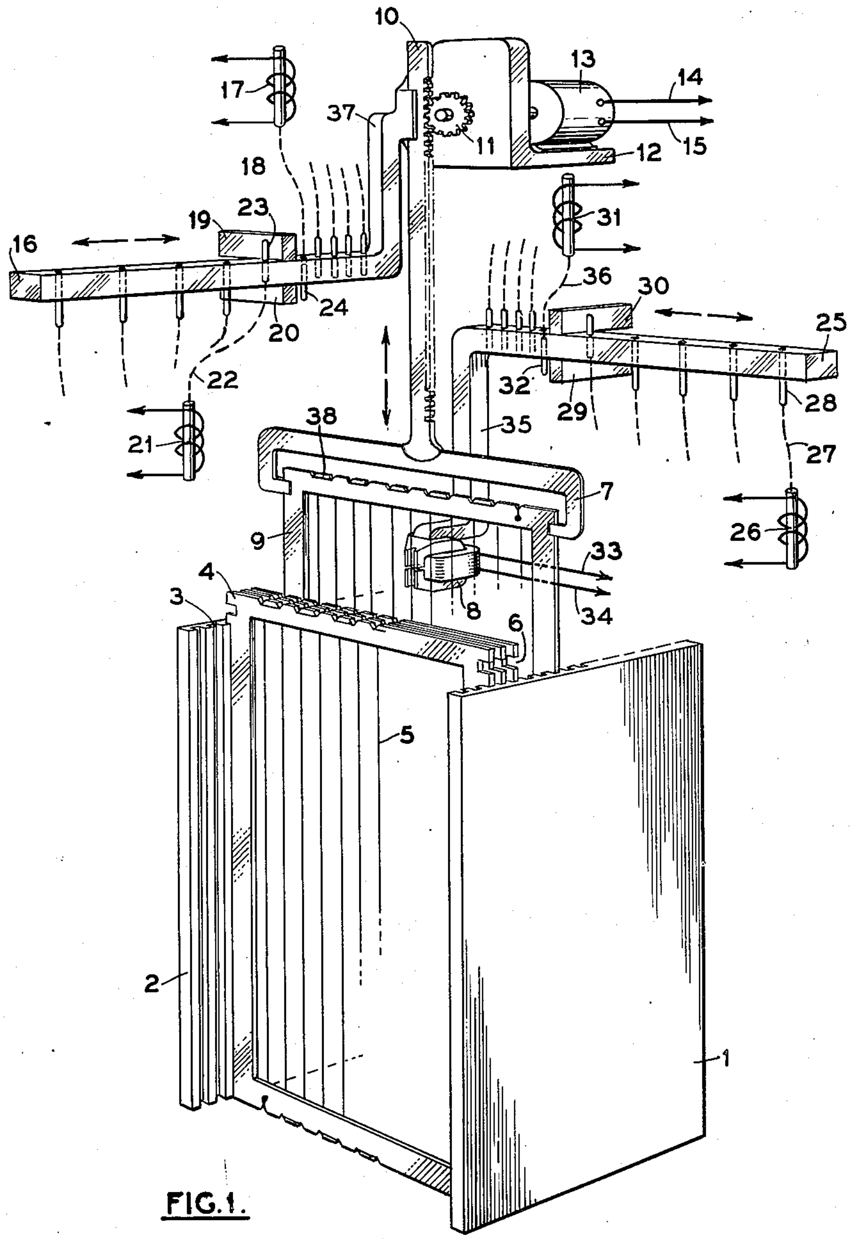

Fig. 1 shows the slotted frame plates 1 and 2 having longitudinal slots 3 holding a large number of frames 4. Frames 4 are free to slide up and down in slots 3. Frames 4 are strung with a large number of longitudinal parallel wires 5. A selected frame may be lifted upward by jaws 7 pulled by rack 10 moved by pinion 11 which in turn is rotated by motor 13 mounted on base 12. Motor 13 receives power over leads 14—15 and is energized by closing a suitable switch, not shown. A particular frame 9 is shown in a partly raised position. As the frame is raised the magnetic reproducing or pick-up head 8 generates electrical signals from recordings on one of wires 5 and these signals are passed to a utilization means, not shown, over leads 33—34.

The mechanism shown in Fig. 1 permits the selection of any one of the frames 4 and the selection of any wire 5 on the selected frame. In order to select a predetermined frame bar 16 which is connected to base 12 through arm 37 is moved manually or by any suitable electro-mechanical means, not shown, to a position determined by pin 23 bearing against stop 19 and pin 24 bearing against stop 20. The position thus determined locates jaws 7 in slots 6 of a predetermined frame thereby determining which frame is to be raised. Pin 23 is one of a series spaced ten times as far apart as the frames and its selection locates a particular group of ten frames. Pin 24 is one of a series spaced by an amount equal to the space between frames and its selection locates a particular frame in the group of ten.

Each of pins 23 and each of pins 24 is pushed or pulled into operating position by suitable means such as solenoid 21 connected to pin 23 by means of flexible cable 22 and solenoid 17 connected to pin 24 by means of flexible cable 18. Similarly pick-up head 8 is moved manually or by any suitable electro-mechanical means, not shown, first to any one of a number of widely spaced positions determined by one of pins 28 carried by bar 25 connected by frame 35 and to any one of a number of closely spaced positions determined by one of pins 32 similarly located in bar 25. Stop 30 is provided to engage pins 28 and stop 29 to engage pins 32. Pins 28 are pushed or pulled by solenoids one of which is shown as 26 connected to a particular pin 28 by means of flexible cable 27. Similarly pins 32 are operated by solenoids one of which is shown at 31 connected to a particular pin 32 by means of flexible cable 36. The two step positioning of pick-up 8 quickly locates it opposite a particular one of wires 5 which it is desired to select.

Thus Fig. 1 illustrates one form of selector which will quickly select any one of the frames, any one of the wires on the selected frame. This double selection is a two dimensional operation which may be carried out simultaneously and practically instantaneously. A third dimension is provided by raising the selected frame and thereby causing the pick-up head to reproduce the information recorded on the selected wire. If the unit includes 100 frames and each frame carries 100 wires, any piece of information out of 10,000 pieces may be selected in a fraction of a second. The frames may all be included in a two digit number from 00 to 99 while the desired wire may be similarly selected by numbers from 00 to 99. Hence, the complete designation of any particular wire is a four digit number from 0000 to 9999.

Figure 2:
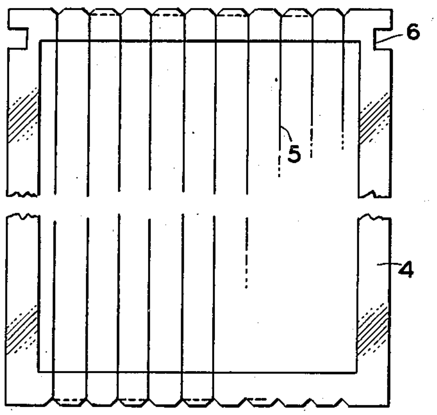

Fig. 2 shows one of the frames 4 carrying the magnetic wires 5. The slots 6 for receiving the lifting fingers are also shown.

Figure 3:
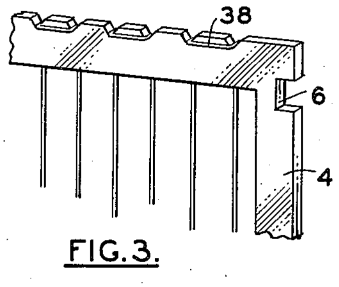
Fig. 3 shows an enlarged detail of a portion of the frame and wires.

Fig. 3 shows a detail of frame 4 showing how the wire may be mounted so that all the wires lie in a plane. This mounting is accomplished in one way by looping the wire around tabs 38.

Figure 4:
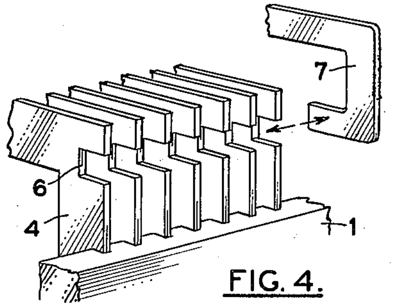
Fig. 4 shows an enlarged detail of a portion of the frames and the frame raising device.

Fig. 4 shows a further detail of the frame 4 mounted on frame 1. This mounting of the frames is such that notches 6 are aligned to permit ready selection by finger 7.

Figures 5, 6, 7:
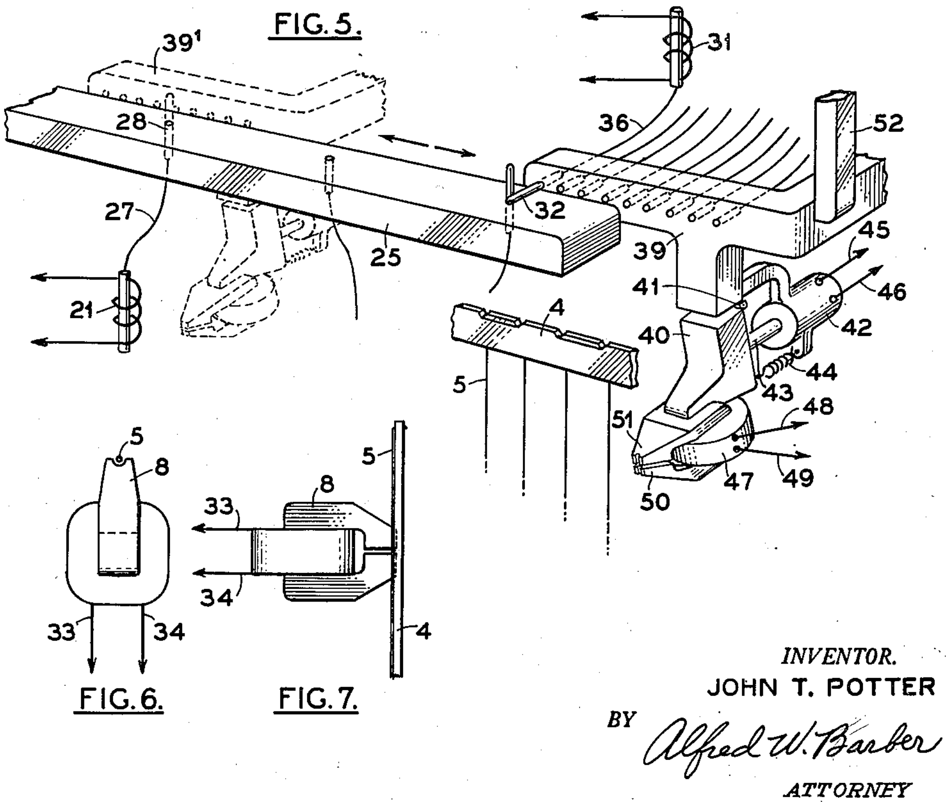
Fig. 5 shows an enlarged view of one of the selecting devices for operation in one dimension.
Fig. 6 shows a top view of the wire pick-up device utilized in the form of Fig. 1.
Fig. 7 shows a side view of the pick-up device of Figs. 1 and 6.

Fig. 5 shows details of the vernier selecting device for one dimension. While it is one possible form of such device it is not intended to limit the scope of the invention. The relative position of one frame 4 is shown. A first frame 25 mounting pins spaced widely to equal ten times the space between adjacent wires 5. A typical pin 28 is designated. A complete frame 25 for a system of 100 wires would have 10 pins 28 for selecting any group of 10 wires. The pins may be actuated in any convenient manner as by means of a solenoid as shown at 21 pushing pin 28 by means of connecting wire 27. A second frame 39 is provided carrying the magnetic pick-up 47. Frame 39 may be supported by arm 52 connecting to the main frame of the equipment. This second frame carries a plurality of stops or pins a typical one being designated as 32. These pins are spaced by an amount equal to the spacing between adjacent wires 5 and in a 100 wire system would number 10. These pins on frame 39 may be actuated by suitable means as by solenoids a typical one being shown at 31 operating pin 32 through wire 36. It will be seen that with this double stop system that any wire on a 100 wire frame may be selected by a two digit number lying between 00 and 99. The first digit representing one of ten pins on the first frame for selecting a given group of ten wires and the second digit for selecting a particular wire within the group. After the two desired pins are selected and pushed out by their actuating solenoids, frame 39 is moved across frame 25 by suitable means, not shown, until the two pins engage thereby positioning pick-up 47 adjacent a wire the information on which is to be reproduced. A phantom outline at 39' shows, for instance, a position for which the designation is 24 positioning by engagement of the 3rd pin on frame 25 and the 5th pin on frame 39.

In order to prevent pick-up 47 from hitting wires as the frame 39 holding it is moved and at the same time providing engagement for the take-off, solenoid 47 may be carried by an arm 40 hinged to arm 39 at 41. When the desired wire has been selected, pick-up 47 is moved into engagement with it by means of a solenoid 42 pushing arm 40 by means of plunger 43 actuated by current supplied over wires 45—46 through a suitable control switch, not shown. Spring 44 pulls pick-up 47 back when the solenoid current is removed thus clearing the wires. Pick-up 47 is a magnetic pick-up having a coil connected to output leads 48—49 and surrounding a magnetic gap formed between poles 50 and 51. As the magnetic wire is drawn across this gap, any magnetic recordings on the wire induce corresponding signals in the pick-up coil and develop a voltage across wires 48—49. This voltage may be utilized in any suitable manner to reproduce the desired information originally recorded on the wire.

Figs. 6 and 7 show top and side views of the magnetic pick-up engaging wire 5. The numerical designations correspond to those used in Fig. 1. The pick-up 8 of Fig. 1 is the same as pick-up 47 of Fig. 5.

Figure 8:
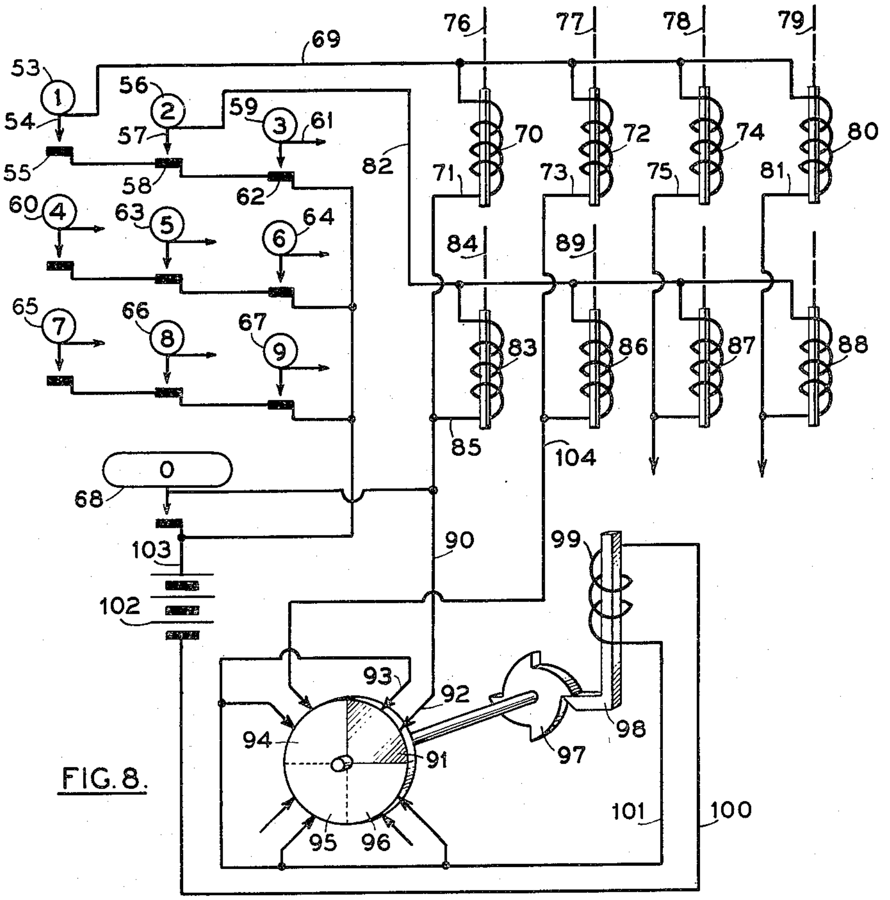
Fig. 8 shows the circuit of a selector suitable for use in the present invention.

Fig. 8 shows circuits suitable for a selector for selecting a particular wire according to the present invention. In Fig. 5 one dimension of the selecting system has been shown in detail. This one dimension utilizes two selecting solenoids for each selection, one for group selection and the other for individual selection within the group. Similarly, the frames may be selected by a second dimensional selector utilizing two solenoids, one for group and the other for individual selection. Thus, four solenoids provide selection in two dimensions. Each of these solenoids in one of a group of ten representable by a digit from 0 to 9 so that forty solenoids representable by a four digit number from 0000 to 9999 permits any one of 10,000 wires grouped on 100 frames and100 wires to a frame.

The selector shown in Fig. 8 has ten selector keys 53, 56, 59, 60, 63, 64, 65, 66, 67 and 68 carrying designations 1, 2, 3, 4, 5, 6, 7, 8, 9 and 0. Each selector key closes a circuit to its four corresponding solenoids. Which one of the four solenoids is actuated is controlled by a sector switch 95. This sector switch is advanced a quarter turn by ratchet motor 97—98—99 each time a selector key is pressed activating the next group of solenoids.

Tracing a typical circuit, assume key 53 (number 1) is pressed closing contacts 54—55. This completes a circuit over wire 69 to one side of all the number 1 solenoids, 70, 72, 74 and 80 corresponding to the number 1 solenoids 17, 21, 31 etc. of Figs. 1 and 5. The return circuits of these solenoids 71, 73, 75 and 81 go to the sector switch at 91, 94, 95 and 96 respectively. Sector 91 is of conducting material and closes the circuit between points 92 and 93 thereby completing the circuit of solenoid 70 through ratchet coil 99, lead 100, energizing battery 102, and lead 103 to contact 55. Hence, when key 53 is pressed, solenoid 70 pulls in and the ratchet motor advances the conducing sector 91 to the next quarter position in a counter-clockwise direction. If key 56 had been pressed instead of key 53, solenoid 83 in the second group would have been actuated. While only the eight relays corresponding to the first two keys are shown it will be understood that thirty-two more solenoids are required in the system. The way in which the solenoids operate selecting pins through wire 76, 77, 78 etc. is shown in Fig. 5.

In the second sector switch the second relay in each group is actuated upon pressing a selector key and so on until the four selecting relays for determining the selection of a particular wire have operated.

Figure 9:
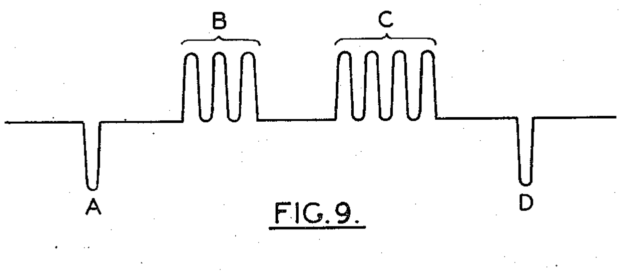
Fig. 9 shows a typical recorded waveform on a small portion of the memory wire.

Fig. 9 shows a representation of typical information recorded on a short section of one of the memory wires. Numbers from 0 to 9 and all letters of the alphabet may be represented by a number from 1 to 36. The representation shows first a negative priming pulse A, a group of three positive pulses B, four positive pulses C spaced from B and an ending pulse D. This record represents the number 34 which may be coded as the 24th letter in the alphabet X. One wire may carry 50 to 100 or more groups of pulses coded to designate 50 to 100 numbers and/or letters spelling out certain desired information.

Figure 10:
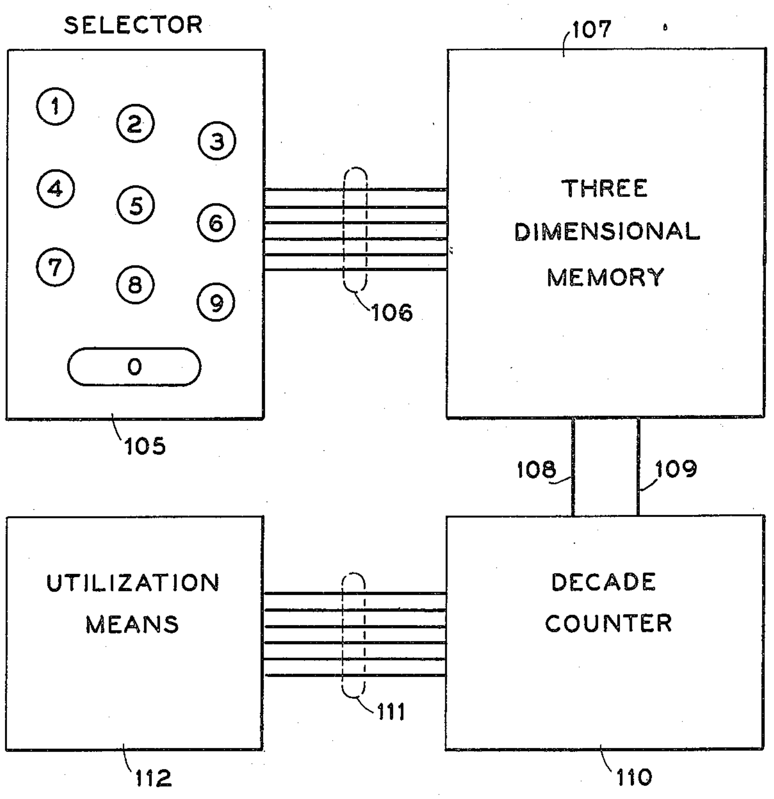
Fig. 10 shows a block diagram of a complete three dimensional memory system.

Fig. 10 shows in block diagram a complete electronic three dimensional memory system. Selector 105 selects the wire carrying the information required. Selector 105 is connected to the three dimensional memory unit 107 by suitable circuits 106. The pulses from the selected wire in the memory unit may be utilized in any suitable manner as by feeding an electronic decade counter 110 over signal lead 108 and 109. Suitable decoding or other utilization means 112 is coupled to counter 110 over circuits 111.

While only a single embodiment of the present invention has been shown and described, many modifications will be apparent to those skilled in the art within the spirit and scope of the invention as set forth in the appended claims.

What is claimed is:

1. In a system for storing, selecting and reproducing magnetically recorded information, the combination of, a great plurality of substantially equal length straight magnetic recording paths, means for supporting groups of said paths in flat sheet-like arrays, means for supporting a plurality of said arrays in parallel sandwich formation, means for reproducing recordings carried by said paths including a magnetic reproducer, means for selecting a predetermined array, means for selecting a predetermined path in said selected array and means for relatively moving said reproducer and said selected path along a straight line to reproduce the recording carried by said selected path.

2. In a coded pulse information storing, selecting and reproducing system, means for supporting said frames in parallel sandwich formation, the combination of, a plurality of rectangular frames, steel wire carrying magnetically recorded coded pulse information mounted on each of said frames to form a great plurality of parallel wire strands in flat sheet-like groups, and means for reproducing said information including a magnetic reproducer, means for selecting a predetermined one of said frames, means for selecting a predetermined strand on said selected frame and means for moving said reproducer and said predetermined strand relatively along a straight line to reproduce recording carried by said selected path.

3. In a system for storing, selecting and reproducing magnetically recorded coded information, the combination of at least several thousand rectilinear magnetic record tracks, means for supporting said tracks in coplanar relationship to form a plurality of sheets of tracks, means for supporting at least twenty-five of said sheets in closely spaced array to substantially occupy a simple geometrical three dimensional space, an electromagnetic reproducer, means for relatively moving any given track and said reproducer to cooperatively position said track and said reproducer, and means for further relatively moving said track and said reproducer along a straight line to reproduce the recording carried by said track.

4. In a system for storing, selecting and reproducing magnetically recorded coded information, the combination of, a great plurality of rectilinear magnetic record tracks, means for supporting said tracks in a tightly packed three dimensional array, a magnetic reproducer for reproducing information recorded upon said tracks, means for relatively moving said reproducer and a predetermined track along a predetermined path, means for relatively moving said reproducer and said predetermined track along a second predetermined path intersecting the first said path at right angles, and means for relatively moving said reproducer and said predetermined track along a third predetermined path intersecting the said second path at right angles and continuing in a straight line along the last said path to reproduce recorded information carried by said predetermined track.

5. In a system for storing, selecting and reproducing magnetically recorded coded information, the combination of, a great plurality of rectilinear magnetic record tracks, means for supporting said tracks in a tightly packed three dimensional array, a magnetic reproducer for reproducing information recorded upon said tracks, means for relatively moving said reproducer and a predetermined track along a predetermined path, means for relatively moving said reproducer and said predetermined track along a second predetermined path intersecting the first said path at right angles, means for moving said reproducer and said predetermined track along a third predetermined path intersecting the second said path at right angles, and means for moving said reproducer and said predetermined track relatively along a straight line and in substantially the same direction as said third moving to reproduce recorded information carried by said predetermined track.

6. In a system for storing, selecting and reproducing magnetically recorded coded information, the combination of, a great plurality of rectilinear magnetic record tracks, means for supporting said tracks in sheet-like groups and in a tightly packed three dimensional array of said groups, a magnetic reproducer for reproducing information recorded upon said tracks, means for relatively moving said reproducer and a predetermined track along a first predetermined path to select a predetermined group containing said predetermined track, means for relatively moving said reproducer and said predetermined track along a second predetermined path intersecting the first said path at right angles for selecting said predetermined track within said predetermined group and means for relatively moving said reproducer and said predetermined track along a third predetermined path intersecting the second said path at right angles to reproduce recorded information carried by said predetermined track.

7. In a system for storing magnetically recorded information, the combination of, a plurality of straight line record paths comprising magnetic recording media, a plurality of frames for supporting said record paths in sheet-like formation, a rack for supporting said frames in parallel sandwich formation, a transducer for individually engaging said record paths, and access mechanism for bringing said transducer into engagement with a predetermined record path by relative movements, between said transducer and the last said record path, having three predetermined mutually perpendicular components.

JOHN TUFT POTTER.

REFERENCES CITED

The following references are of record in the file of this patent:

UNITED STATES PATENTS

| Number | Name | Date |
|---|---|---|
| 2,080,100 | Tauschek | May 11, 1937 |
| 2,335,277 | Heller | Nov. 30, 1943 |
| 2,377,764 | Dickinson | June 5, 1945 |
| 2,416,445 | Jensen | Feb. 25, 1947 |
| 2,472,542 | Moerman | June 7, 1949 |
| 2,502,960 | Johnson | Apr. 4, 1950 |
| 2,514,578 | Heller et al. | July 11, 1950 |

FOREIGN PATENTS

| Number | Country | Date |
|---|---|---|
| 539,745 | Great Britain | Sept. 23, 1941 |